United States Patent [19]

Satoh et al.

[11] Patent Number: 5,337,995
[45] Date of Patent: Aug. 16, 1994

[54] POWER SEAT FRAME ASSEMBLY

[75] Inventors: Munetaka Satoh, Kariya; Sadao Ito, Anjyo; Hiroshi Nawa, Kariya, all of Japan

[73] Assignee: Aisen Seiki Kabushiki Kaisha, Japan

[21] Appl. No.: 48,450

[22] Filed: Mar. 30, 1993

[30] Foreign Application Priority Data

Mar. 31, 1992 [JP] Japan .......................... 4-076971

[51] Int. Cl.⁵ ............................................ F16M 13/00
[52] U.S. Cl. .................................. 248/429; 248/394; 248/421; 297/344.2; 297/344.17
[58] Field of Search ............... 248/429, 430, 419, 424, 248/420, 421, 394; 74/425; 297/346, 344; 296/65.1

[56] References Cited

U.S. PATENT DOCUMENTS

| 3,124,332 | 3/1964 | Heyl | 248/430 |
| 4,721,337 | 1/1988 | Tomita | 297/344 |
| 4,889,379 | 12/1989 | Aso | 296/65.1 |
| 5,014,958 | 5/1991 | Harney | 297/346 X |
| 5,094,420 | 3/1992 | Aihara | 248/430 |
| 5,125,611 | 6/1992 | Cox | 248/420 |
| 5,176,353 | 1/1993 | Aihara | 248/419 |

FOREIGN PATENT DOCUMENTS

| 3503897 | 8/1986 | Fed. Rep. of Germany | 248/430 |
| 1-161123 | 11/1989 | Japan . | |

Primary Examiner—J. Franklin Foss
Attorney, Agent, or Firm—Finnegan, Henderson, Farabow, Garrett and Dunner

[57] ABSTRACT

A power seat frame assembly includes a screw nut and rod assembly which is pre-assembled as a unit before being mounted on a bracket fixed to a rail for vehicle's seat. A gear box of the screw rod and nut assembly is disposed merely in a space between opposed walls on the bracket and the screw rod is received in an opening upper recess of the bracket. Thus, the arrangement of the screw rod and nut assembly on the bracket becomes easier.

4 Claims, 3 Drawing Sheets

5,337,995

POWER SEAT FRAME ASSEMBLY

BACKGROUND OF THE INVENTION

1. Field of the Invention

The present invention relates to a power seat frame assembly and more particularly to a power seat frame assembly having a screw rod and nut assembly which is pre-assembled as a unit.

2. Description of the Prior Art

Generally, a power seat for vehicles uses a screw rod and nut assembly for slidable movement of a seat in the front and rear direction and/or vertical movement of a Dart of the seat cushion. Such a screw rod and nut assembly includes a screw rod supported at its ends on an upper rail, a nut engaged with the screw rod and secured to a lower rail or a seat cushion, and a reduction gear box operably connected to the screw rod and an electric motor for allowing the screw rod to be rotated. When the motor is actuated and the screw rod is rotated, the nut is linearly moved along the screw rod so that a linear movement of the seat or a vertical movement of a Dart of the seat cushion is obtained.

Problems encountered with this screw rod and nut assembly are that after the gear box is secured to a bracket which is fixed on the rail the screw rod has to be engaged with the gear box and a proper position of the screw rod with respect to the gear box and the seat cushion must be adjusted. This makes the arrangement of the screw rod and nut assembly complicated and requires excessive working time.

SUMMARY OF THE INVENTION

It is, therefore, an object of the present invention to provide a power seat frame assembly having an improved screw rod and nut assembly and bracket to which said assembly attaches, while eliminating the above-described disadvantages encountered in the prior art.

According to the present invention, the fore-going objects are attained by providing a power seat frame assembly comprising, a lower rail for attachment to a vehicle floor, an upper rail supporting a passenger seat and slidably attached to the lower rail for a linear movement of the upper rail along the lower rail, a bracket secured to one of the rails and having opposed walls which each includes an opening upper recess, and a screw rod and nut assembly as a unit for a linear movement and/or vertical movement of the passenger seat, the screw rod and nut assembly including a screw rod for rotation, a nut engaged with the screw rod and secured to the other of the rails, a gear box operably connected to a motor and the screw rod, the gear box of the screw rod and nut assembly being arranged between the opposed walls of the bracket and the screw rod being received in the recess.

Preferably, the bracket further has an upwardly extending wall for receiving a free end of the screw rod of the screw rod and nut assembly through an opening upper recess. The bracket is connected at its sides to a pair of the upper rails and the screw rod and nut assembly further includes a transverse rod for rotational movement in response to the linear movement of the nut along the rotating screw rod and secured to a seat cushion of the passenger seat.

According to the present invention there is further provided a power seat frame assembly comprising, a pair of a lower rails for attachment to a vehicle floor, a pair of upper rails supporting a passenger seat and slidably attached to the lower rails for a linear movement of the upper rails along the lower rails, a bracket secured to the upper rails and having opposed upstanding walls which each includes an opening upper recess, and a screw rod and nut assembly as a unit for a vertical movement of a seat cushion of the passenger seat, the screw rod and nut assembly including a screw rod for rotation, a nut engaged with the screw rod and secured to the lower rails, a gear box operably connected to a motor and the screw rod, the gear box of the screw rod and nut assembly being arranged between the opposed upstanding walls of the bracket and the screw rod being received in the recess, the bracket further having an upwardly. extending wall for receiving a free end of the screw rod of the screw rod and nut assembly through an opening upper recess thereof, and the screw rod and nut assembly further including a transverse rod for rotational movement in response to the linear movement of the nut along said rotating screw rod and secured to a seat cushion of the passenger seat.

Other features and advantages of the present invention will be apparent from the following description taken in conjunction with the accompanying drawings, in which like reference characters designate the same or similar parts through the figures thereof.

DETAILED EXPLANATION OF A PREFERRED EMBODIMENT

Figure 1:
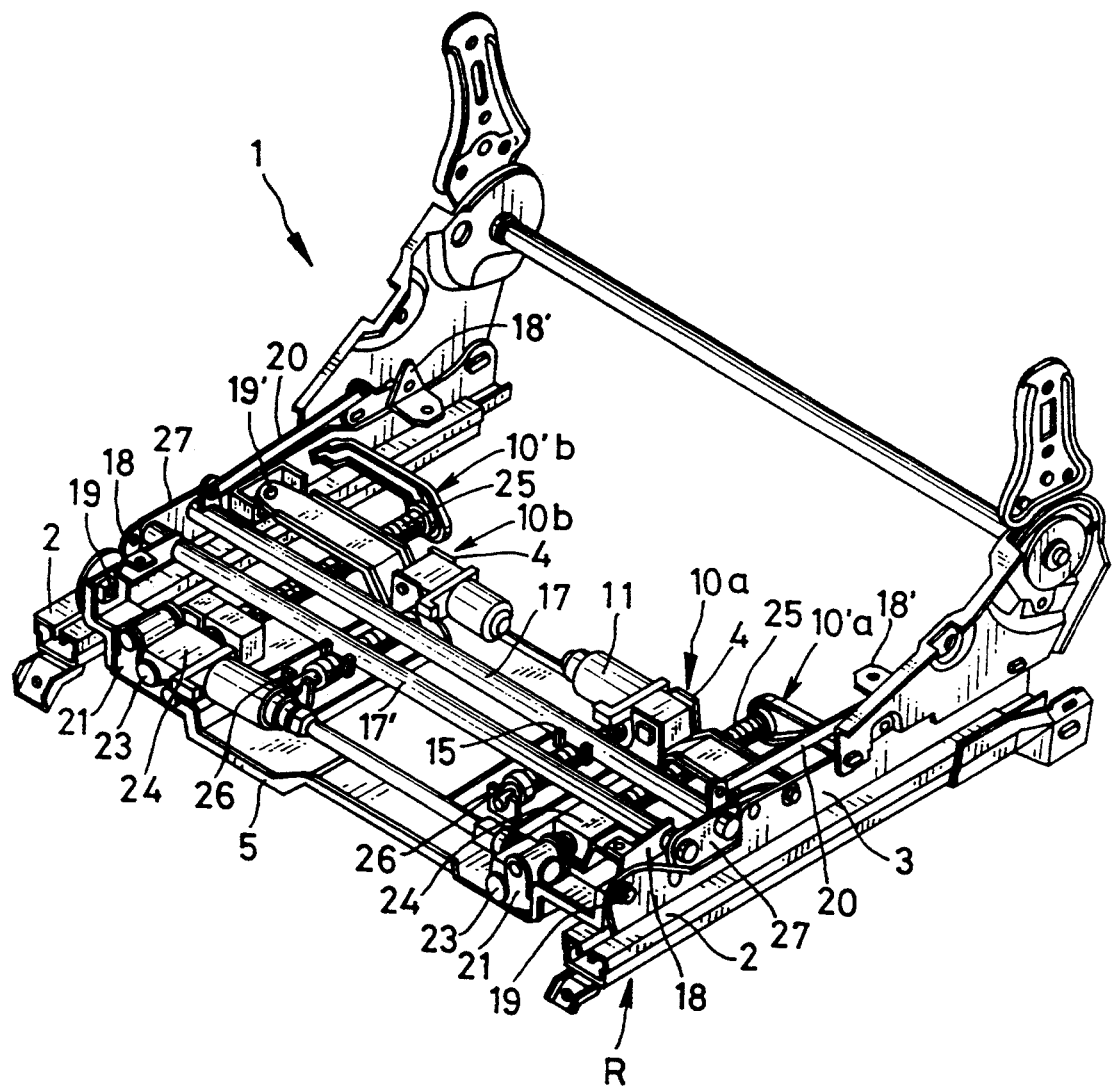
FIG. 1 is a perspective view illustrating a seat frame assembly incorporating an embodiment of the present invention.
Figure 2:
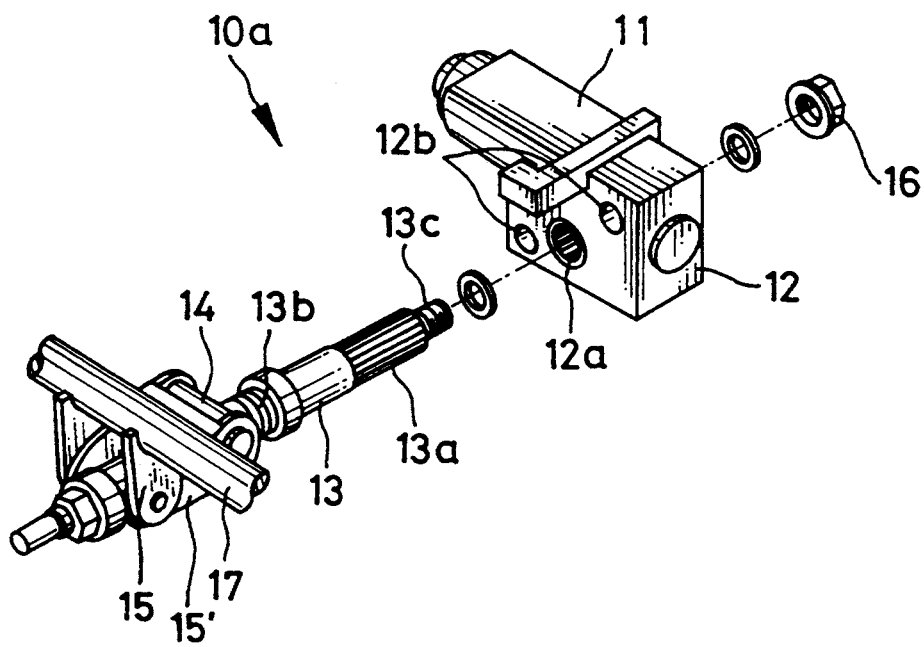
FIG. 2 is a perspective view of a screw rod and nut assembly for a vertical movement of a part of the passenger seat.

Referring now to a preferred embodiment of the present invention, a power seat frame assembly (1) is shown in FIGS. 1–5, which comprises a rail assembly (R) including a pair of lower rails (2) for attachment to a vehicle floor (not shown) and a pair of upper rails (3) supporting a seat cushion of the passenger seat (not shown) through links (18, 18') and slidably attached to the lower rails (2). The upper rails (3) are slidably slidable in the fore and aft direction along the lower rails (2).

A bracket (5) is interposed between both the upper rails and fixed at its sides to the upper rails (3) by means of bolts (19, 19').

First screw rod nut assemblies (10a, 10b) for vertical movement of the seat cushion and second screw rod and nut assemblies (10'a, 10'b) for a linear movement of the passenger seat in the fore and aft directions are mounted on the bracket (5) as shown in FIG. 1. Each assembly (10a, 10'a, 10b, 10'b) is pre-assembled as a unit.

The first screw rod and nut assembly (10a) includes an electric motor (11), a reduction gear box (12) for decreasing the number of the rotation of the motor (11), a screw rod (13) having a threaded portion (13b) and a spline portion (13a), and a nut (14) engaged with the threaded portion (13b) and having a pair of links (15,15'). The link (15') is pivoted to side wall of the nut (14) and the link (15) which is rotatably connected to the link (15') is fixed to a transverse rod (17). The rod (17) is connected through bars (20, 20) to the links (18', 18'), so that for example the rearward movement of the nut (14) along the screw rod (13) causes the transverse rod (17) to be rotated counterclock-wise and a near portion of the seat cushion to be lifted or moved upwardly. The spline portion (13a) of the screw rod (13) is engaged with a spline portion (12a) of the gear box (12) and the screw rod (13) is secured to the gear box (12) through a threaded portion (13c) and a nut (16) fastened thereto.

The other screw rod and nut assembly (10b) has the same construction as that of the afore-mentioned assembly (10a), but the link (15) is fixed to a transverse rod (17') to raise or fall the front portion of the seat cushion. The rod (17') is connected through the links (18, 18') to the front portion of the seat cushion.

The second screw rod and nut assemblies (10'a, 10'b) are driven by a single motor (26) to slide the passenger seat in the front and rear direction. Each assembly (10'a, 10'b) includes a reduction gear (23), a nut (24) secured to the lower rail (2) and a screw rod (25) secured to the upper rail (3).

Figure 4:
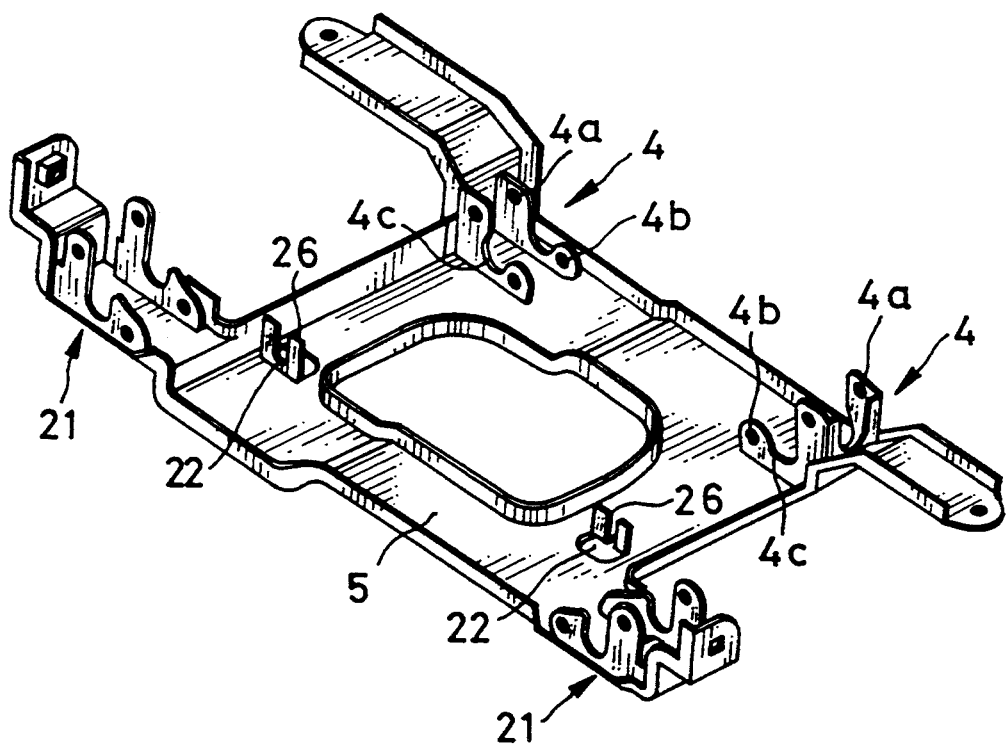
FIG. 4 is a perspective view of the bracket.
Figure 5:
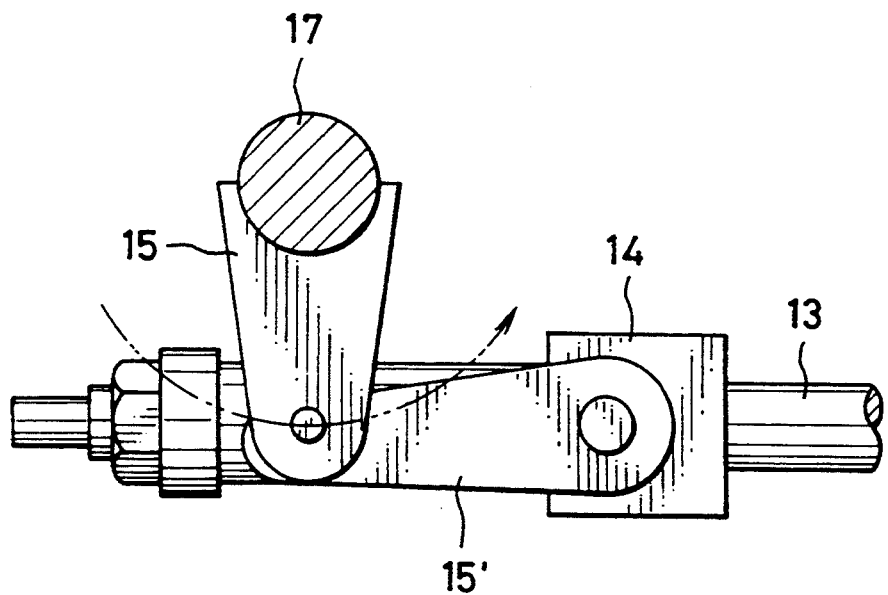
FIG. 5 is a side view illustrating the relation of the linear movement of the nut along the screw rod and the rotation of a transverse rod.

As illustrated in FIG. 4, the bracket (5) includes a pair of the opposed walls (4, 4) having holes (4a, 4b) and opening upper recesses (4c, 4c). The bracket (5) further includes a pair of the opposed walls (22, 22) having holes and opening upper recesses (26, 26). Upwardly extending walls (21, 21). are located at positions away from the opposed walls (4, 4).

Figure 3:
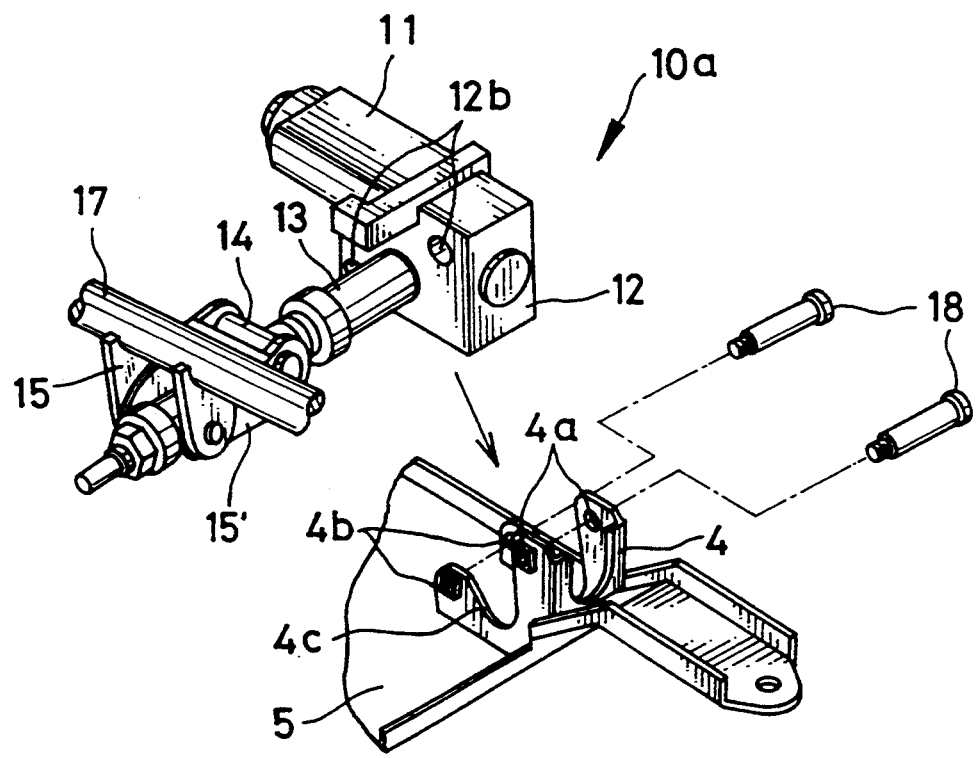
FIG. 3 is a perspective view of the screw rod and nut assembly before being mounted on a bracket of the seat frame assembly.

Referring now to FIGS. 1 and 3, the gear box (12) of each first screw rod and nut assembly (10a, or 10b) is positioned between the opposed walls (4), namely, housed in a space between the opposed walls (4), and a free end of the screw rod (13) by the recess (26) of the upwardly extending wall (22). At the same time gear box (12) is arranged between the opposed walls (4), since the screw rod (13) is put merely in the recesses (4c, 26), after that, bolts (18, 18) are inserted into holes (4a, 4b, 12b) and connecting plates (27, 27) fixed to ends of the rods (17, 17') are secured to the upper rails (3, 3). This arrangement is easier.

In the case of the attachment of the second screw rod and nut assemblies (10'a, 10'b) the aforementioned arrangement step is employed, so that a working time for attachments of the assemblies (10a, 10b, 10'a, 10'b) is so reduced.

As many apparently widely different embodiments the present invention can be made without departing from the spirit and scope thereof, it is to be understood that the invention is not limited to the specific embodiments thereof except as defined in the appended claims.

What is claimed is:

1. A power seat frame assembly comprising:
   a lower rail for attachment to a vehicle floor;
   an upper rail supporting a passenger seat and slidably attached to said lower rail for a linear movement of the upper rail along said lower rail;
   a bracket secured to one of said rails and having opposed walls, each including an open upper recess; and
   a screw rod and nut assembly pre-assembled as a unit for a linear movement and/or vertical movement of the passenger seat;
   said screw rod and nut assembly including a screw rod for rotation, a nut engaged with said screw rod and secured to the other of said rails, a gear box operably connected to a motor and said screw rod, said gear box of said screw rod and nut assembly being arranged between said opposed walls of said bracket, and said screw rod being received in said recess, said opposed walls and the recesses being substantially perpendicular to an axis of said screw rod and a respective front and rear surface of said walls facing corresponding surfaces of said gear box.

2. A power seat frame assembly according to claim 1, wherein said bracket further has an upwardly extending wall for receiving a free end of said screw rod of said screw rod and nut assembly through an opening upper recess.

3. A power seat frame assembly according to claim 2, wherein said bracket is connected at its sides to a pair of said upper rails and said screw rod and nut assembly further includes a transverse rod for rotational movement in response to the linear movement of said nut along said rotating screw rod and secured to a seat cushion of said passenger seat.

4. A power seat frame assembly comprising:
   a pair of lower rails for attachment to a vehicle floor;
   a pair of upper rails supporting a passenger seat and slidably attached to said lower rails for a linear movement of the upper rails along said lower rails:
   a bracket secured to said upper rails and having opposed upstanding walls, each including an open upper recess; and
   a screw rod and nut assembly pre-assembled as a unit for a vertical movement of a seat cushion of the passenger seat;
   said screw rod and nut assembly including a screw rod for rotation, a nut engaged with said screw rod and secured to said lower rails, a gear box operably connected to a motor and said screw rod, said gear box of said screw rod and nut assembly being arranged between said opposed upstanding walls of said bracket, and said screw rod being received in said recess, said opposed walls and the recesses being substantially perpendicular to an axis of said screw rod and a respective front and rear surface of said walls facing corresponding surfaces of said gear box, said bracket further having an upwardly extending wall for receiving a free end of said screw rod through an opening upper recess thereof, and said screw rod and nut assembly further including a transverse rod for rotational movement in response to a linear movement of said nut along said rotating screw rod and secured to a seat cushion of said passenger seat.

* * * * *

UNITED STATES PATENT AND TRADEMARK OFFICE
CERTIFICATE OF CORRECTION

PATENT NO. : 5,337,995
DATED : August 16, 1994
INVENTOR(S) : Munetaka SATOH et al.

It is certified that error appears in the above-indentified patent and that said Letters Patent is hereby corrected as shown below:

On cover page, item [73] change "Aisen Seiki Kabushiki Kaisha" to --Aisin Seiki Kabushiki Kaisha--.

Signed and Sealed this

Twenty-ninth Day of August, 1995

Attest:

BRUCE LEHMAN

*Attesting Officer*     *Commissioner of Patents and Trademarks*